United States Patent
Parlamas et al.

(10) Patent No.: US 7,768,909 B1
(45) Date of Patent: Aug. 3, 2010

(54) CONGESTION CONTROL IN AN IP NETWORK

(75) Inventors: Stephanie Parlamas, Colts Neck, NJ (US); Harish Samarasinghe, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1452 days.

(21) Appl. No.: 11/068,540

(22) Filed: Feb. 28, 2005

Related U.S. Application Data

(63) Continuation-in-part of application No. 10/754,043, filed on Jan. 8, 2004.

(60) Provisional application No. 60/514,945, filed on Oct. 28, 2003.

(51) Int. Cl.
*H04L 12/26* (2006.01)

(52) U.S. Cl. .................. 370/229; 370/235; 709/228; 709/239

(58) Field of Classification Search .......... 370/229, 370/230, 235, 522
See application file for complete search history.

(56) References Cited

U.S. PATENT DOCUMENTS

| | | | |
|---|---|---|---|
| 5,253,248 A | | 10/1993 | Dravida et al. |
| 5,491,801 A | | 2/1996 | Jain et al. |
| 5,548,533 A | | 8/1996 | Gao et al. |
| 5,726,976 A | * | 3/1998 | Thompson et al. .......... 370/229 |
| 6,064,892 A | | 5/2000 | Miyagawa et al. |
| 6,363,052 B1 | | 3/2002 | Hosein |
| 6,469,991 B1 | * | 10/2002 | Chuah .................. 370/329 |
| 6,473,402 B1 | | 10/2002 | Moharram |
| 2001/0032269 A1 | * | 10/2001 | Wilson .................. 709/235 |
| 2003/0210649 A1 | * | 11/2003 | Bondi .................. 370/229 |
| 2004/0062375 A1 | * | 4/2004 | Wang et al. ............ 379/219 |
| 2004/0153547 A1 | * | 8/2004 | Trossen ............... 709/228 |
| 2006/0193259 A1 | * | 8/2006 | Sanchez Cembellin et al. .. 370/235 |

FOREIGN PATENT DOCUMENTS

WO   WO 03/015354 A1   2/2003

OTHER PUBLICATIONS

RFC 3261, SIP: Session Initiation Protocol, by J. Rosenberg, et. al, , Sec. 11.1-11.2, Jun. 2002, http:/www.ietf.org/rfc/rfc3261.txt.*

* cited by examiner

*Primary Examiner*—Albert T Chou

(57) ABSTRACT

Upon detection of an overload condition at a network element, a series of messages is sent between the network element and those other network elements which may potentially send request messages to the overloaded network element. The detection of an overload condition may be based on a determination that at least one of a plurality of processing thresholds has been exceeded. If the network utilizes the SIP signaling protocol, then the messages include SIP INVITE, SIP TRYING, SIP CANCEL, SIP OPTIONS and SIP OK. The CANCEL and OPTIONS messages comprise an indication that the overloaded network element is overloaded and an instructed action for the other network elements. Upon receipt of the message indicating an overload condition, the other network elements restrict sending request messages to the overloaded network element. The other network elements may send request messages to network elements other than the overloaded network element which provide functionality similar to that of the overloaded network element.

28 Claims, 4 Drawing Sheets

CONGESTION CONTROL IN AN IP NETWORK

This application is a continuation-in-part of prior application Ser. No. 10/754,043 filed Jan. 8, 2004, which claims the benefit of U.S. Provisional Application No. 60/514,945, filed Oct. 28, 2003, both of which are incorporated herein by reference.

BACKGROUND OF THE INVENTION

The conventional Public Switched Telephone Network (PSTN) is a circuit switched network in which calls are assigned dedicated circuits during the duration of the call. Such networks are well known in the art, and service providers have developed various services which may be provided to subscribers via such a conventional circuit switched network.

Recently, data packet networks, such as local area networks (LAN) and wide area networks (WAN) have become more prevalent. These data packet networks operate in accordance with the internet protocol (IP) and such networks are referred to as IP networks. The popularity of IP networks has created an interest in providing voice and related services over IP networks.

Conventional PSTN voice services dedicate a circuit connection between a calling and called party, and as such, that connection is guaranteed a certain level of performance because it is not shared with any other network users. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties. As such, it is easy to guarantee a certain level of service via the circuit network. The problem with such a network is that of efficiency. That is, the dedication of a circuit between all calling and called parties may be inefficient because such dedicated circuits provide more bandwidth than is necessary. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

One of the difficulties with providing voice and other services over an IP network is that certain services require a minimum guaranteed level of service. For example, in order for a voice over IP (VoIP) call to provide an acceptable level of service, the connection must provide a certain bandwidth so that voice quality is acceptable. Other related services (e.g., data, video) also require a minimum guaranteed level of service in order to be acceptable. As IP network traffic increases, the network may become congested, and as such, the services provided via the network may become degraded.

Network congestion may be the result of the network elements becoming overloaded. For example, if the load on a network element becomes greater than its processing capability, then an overload condition may be reached at the network element. Such an overload condition could result in degraded performance and network services provided in connection with the network element may be adversely impacted. A serious problem occurs when the service provided by the network falls below a required minimum guaranteed level of service.

What is needed is a technique for controlling network congestion resulting from an overload condition at network elements.

BRIEF SUMMARY OF THE INVENTION

The present invention provides a method for congestion control in an IP network. In accordance with an embodiment of the invention, when a network element detects an overload condition, the network element informs its so-called counterpart network elements of the overload condition. The counterpart network elements of a particular network element are those network elements which potentially send request messages to the particular network element.

In one embodiment, the overloaded network element informs its counterpart network elements of the overload condition as follows. The overloaded network element sends to its counterparts a first message. The counterpart network elements receiving the first message respond with a second message. The overloaded network element then sends to the counterpart network elements a third message containing an indication that the overloaded network element is overloaded. The counterpart network elements, upon receipt of the third message, respond with a fourth message which is an acknowledgement of the third message. In accordance with a particular embodiment of the invention which is implemented in an IP network which utilizes the Session Initiated Protocol (SIP) for call setup signaling, the first message is a SIP INVITE message, the second message is a SIP TRYING message, the third message is a SIP CANCEL message, and the fourth message is a SIP OK message.

In another embodiment, the overloaded network element informs its counterpart network elements of the overload condition by sending a SIP OPTIONS message to the counterpart network elements. As discussed in further detail below, the SIP OPTIONS message comprises one of a plurality of instructed actions The counterpart network elements receiving the OPTIONS message respond with a SIP OK message.

The determination of an overload condition may be based on a determination that a network element has exceeded one of a plurality of processing thresholds. These multiple thresholds may be configured as appropriate for the particular implementation. In addition, different actions may be configured as responses to exceeding the different thresholds. The overloaded network element sends instructions to the counterpart network elements as appropriate depending upon the particular processing threshold that was exceeded. For example, one such instruction may be that the overloaded network element instructs the counterpart network elements to not send any further messages to the overloaded network element during a delay period. Another such instruction may be that the overloaded network element notifies the counterpart network elements of a limit on the number of messages that may be sent to the overloaded network element.

The use of the method of the present invention provides an improved method of congestion control in an IP network. Notifying the counterpart network elements that a particular network element is overloaded (i.e., has reached some processing threshold) allows the counterpart network elements to begin sending at least some of their request messages to other network elements (if available) which provide the same functionality as the overloaded network element. This helps prevent the overloaded network element from causing a degradation in service to users of the IP network.

These and other advantages of the invention will be apparent to those of ordinary skill in the art by reference to the following detailed description and the accompanying drawings.

DETAILED DESCRIPTION

Figure 1:
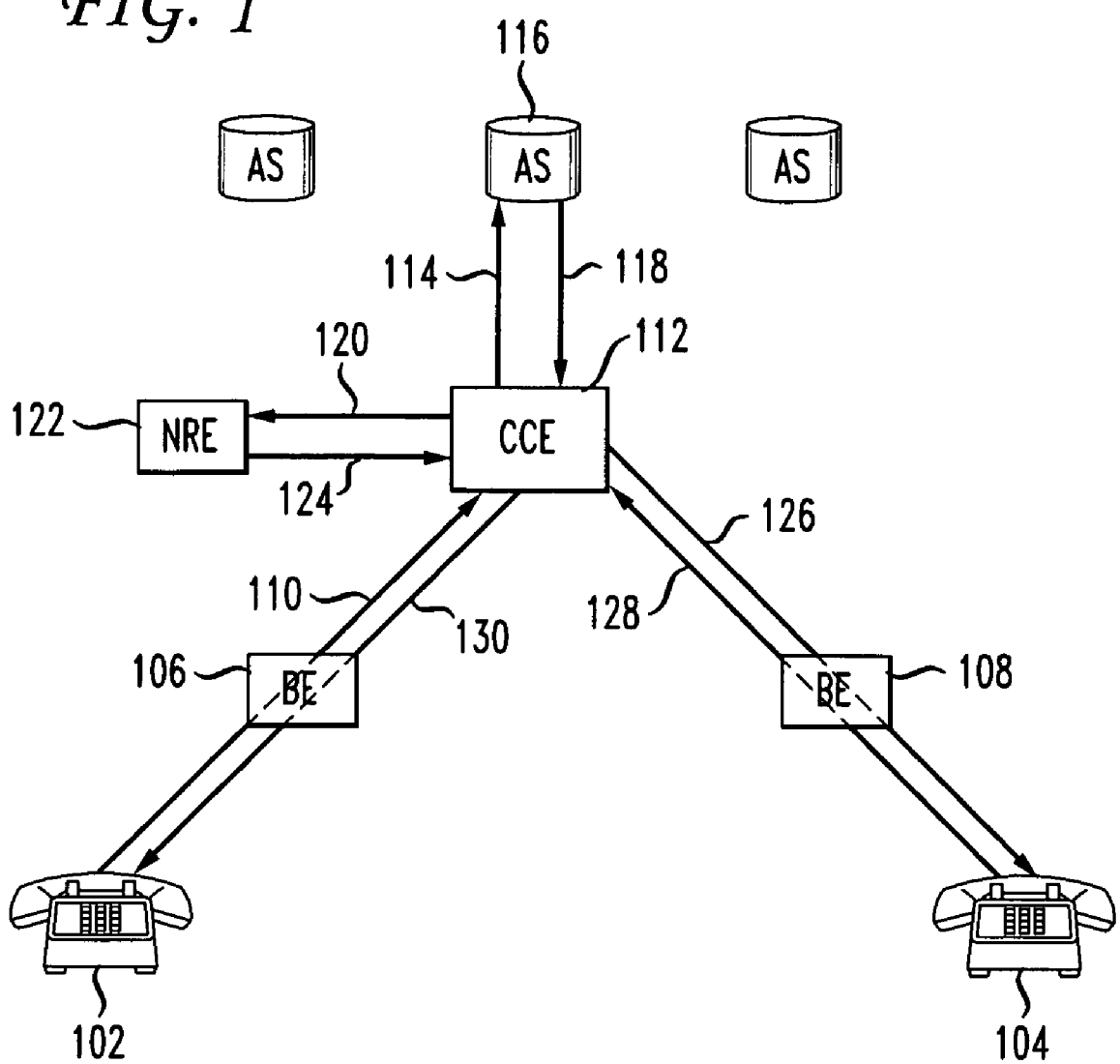
FIG. 1 shows an IP network in which one embodiment of the present invention may be implemented.

FIG. 1 shows an IP network in which one embodiment of the present invention may be implemented. The network utilizes the Session Initiation Protocol (SIP) in order to set up connections (e.g., VoIP calls) between users. SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention.

With reference to FIG. 1, it is to be understood that the network elements shown in FIG. 1 are logical entities. Such logical entities may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, the basics of call set-up will be described. Assume that IP enabled telephone 102 wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, the transaction begins by telephone 102 sending an INVITE request 110 addressed to telephone 104's Uniform Resource Identifier (URI) which identifies telephone 104. The INVITE request contains a number of header fields which are named attributes that provide additional information about a message. The details of an INVITE are well known and will not be described in detail at this point.

The INVITE message 110 is received at the call control element (CCE) 112. The CCE 112 performs the functions of interfacing with other network elements such as Border Elements, Service Brokers (SB), Application Servers (AS), Media Servers (MS), Network Routing Engines (NRE), and others, to provide the necessary functions to process a call request. The CCE 112 determines whether special feature processing is required by the call based on the information it receives in the incoming call request (for example the dialed number in the incoming call request). One example of special processing is 8YY (e.g., 800) service processing. If special feature processing is required, the CCE 112 sends a query (an SIP INVITE) 114 to the appropriate application server (AS), for example AS 116. The AS 116 performs the required feature processing and returns by message 118 an appropriate routing number for the call. Upon receipt of the routing number, the CCE 112 sends a request message (SIP INVITE) 120 to the network routing engine (NRE) 122 to determine the IP address of the appropriate BE for further routing. The NRE 122 returns the requested information by message 124. It is noted that the NRE 122 is shown as a separate logical network element in the network of FIG. 1. In various embodiments, the NRE function may be implemented on the same network node as the CCE 112 or on a separate network node.

Upon receipt of the address of the appropriate BE (in this case BE 108), CCE 112 forwards the INVITE message 126 to telephone 104 via BE 108. The telephone 104 accepts the call by sending an OK message 128 back to the CCE 112. The CCE 112 forwards the OK message 130 to telephone 102 via BE 106. The VoIP call between telephone 102 and telephone 104 is now set up.

The above description is a high level overview of call processing in an IP network using SIP. While all the details of call processing in accordance with SIP are not necessary for an understanding of the present invention, the above description illustrates that there are many messages which are required in order to set up one basic call between two endpoints. Of course, in an actual network implementation, there would be additional network elements as well as many calls being set up simultaneously. Further, as IP networks become more popular, the number of calls being handled by each of the networks will increase, which results in an increase in the SIP signaling traffic which must be handled by the network.

As the signaling traffic increases, the load upon the network elements increases. More specifically, the load upon the network nodes implementing the network elements increases as the signaling traffic increases. For example, referring again to the network of FIG. 1, as the signaling traffic increases, an increased load will be placed upon the CCE. If the processing hardware of the network node upon which the CCE is implemented becomes overloaded, the services provided by the FIG. 1 network will degrade, and may fall below a required minimum level.

The SIP protocol, as currently defined by RFC 3261, does not contain a technique for specifically dealing with network congestion. As such, as traffic in an IP network increases, the SIP signaling will continue to increase and will eventually result in a degradation of services provided by the IP network.

The present invention provides for congestion control in an IP network. While not limited to the SIP protocol, the invention may advantageously be implemented within a network utilizing the SIP signaling protocol for call setup.

Figure 2:
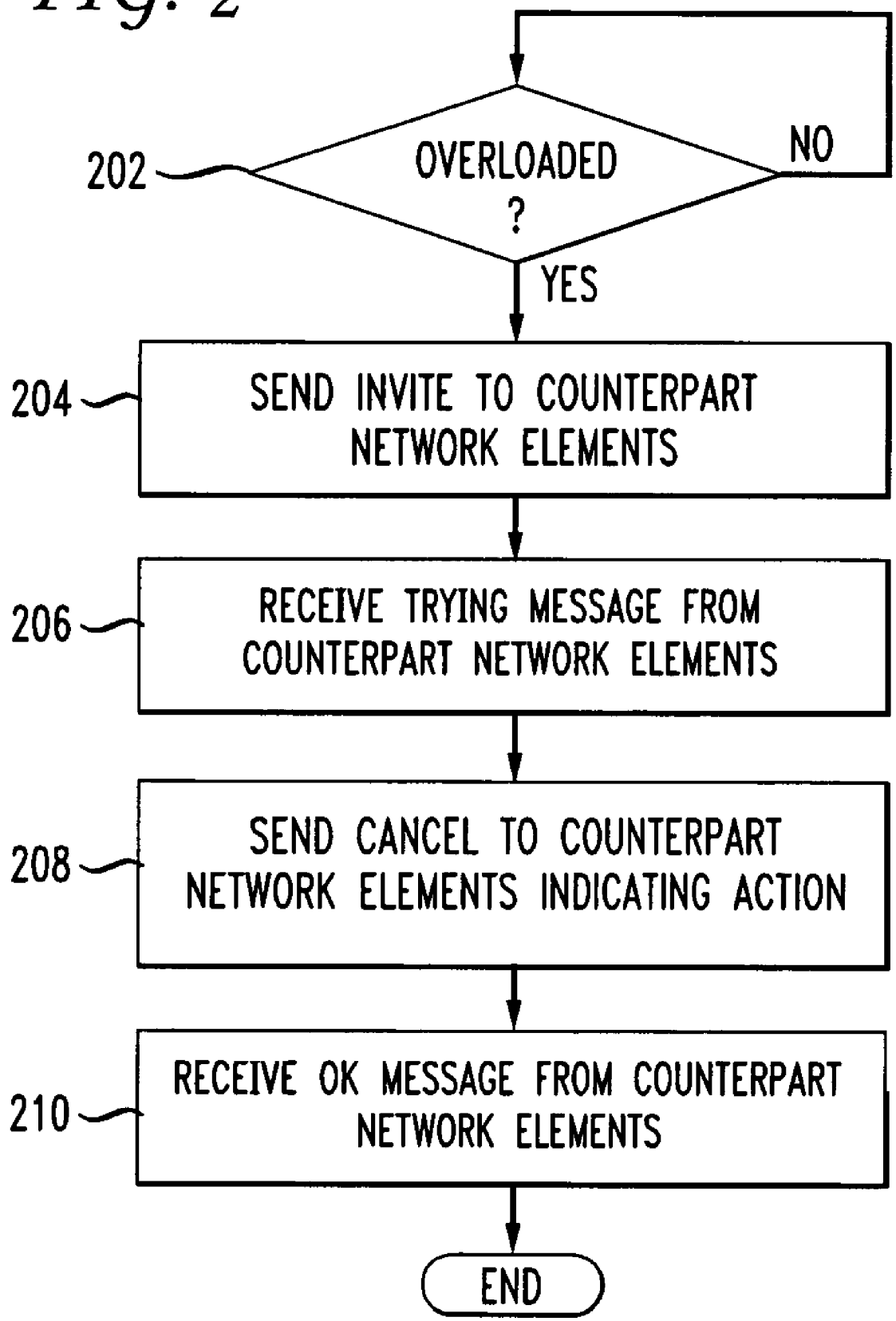
FIG. 2. shows a flowchart illustrating the steps performed by a network element in accordance with an embodiment of the present invention.

FIG. 2 shows a flowchart illustrating the steps performed by a network element in accordance with one embodiment of the present invention. First, in step 202, the network element determines whether an overload condition exists on the network node implementing the network element. There are various ways to accomplish this step. In one embodiment, the network node monitors the processing capacity of its one or more central processing units, and determines that an overload condition exists when the processing capacity reaches some processing capacity threshold. The threshold will be different depending upon the particular implementation of the network node. The network node may determine an overload condition based on the performance criteria of other hardware in addition to its central processing unit. For example, the network node may monitor the traffic being received by its network interfaces or may monitor the amount of data in its buffer or queue.

In one advantageous embodiment, multiple configurable thresholds may be defined for a network element, such that if any one or more of the thresholds is exceeded, an overload condition is deemed to exist. For example, one threshold may define some processing capacity of a processing unit, another threshold may define the amount of traffic being received at a network interface, while another threshold may define the amount of data in a queue. One skilled in the art will recognize that many different types of thresholds, and combinations of thresholds, may be defined. The network element may monitor the multiple thresholds simultaneously.

For clarity of description, a network element executing on a network node in an overload condition may be referred to as an overloaded network element (or a network element having an overload condition). It is to be understood that as used in this description and in the claims, reference to an overloaded network element or network node means that the network element or node has reached or exceeded one or more of its defined thresholds, and does not necessarily mean that the network element or node is overloaded to the point of a degradation of service or even that the processing capacity of the element or node has reached a maximum. In fact, in an implementation of the present invention, it is advantageous to define the thresholds such that a threshold will be reached prior to any actual degradation of network service. Thus, the term overload is used to indicate that the network element or node has reached one or more defined thresholds such that congestion control processing, as described herein, is initiated. As represented by decision block 202, the network node will continuously monitor itself for an overload condition (i.e., one or more thresholds reached or exceeded). Upon detection of an overload condition, the network element executing on the overloaded network node sends an INVITE message to its counterpart network elements. As used herein, the counterparts of a particular network element are those network elements which potentially send requests to the particular network element. Thus, in step 204, the network element executing on the overloaded network node sends an INVITE message to its counterpart network elements. In one embodiment, the INVITE message does not have a session description, protocol (SDP). An appropriate INVITE message sent from an overloaded network element to a counterpart network element is as follows (the line numbers are not part of the SIP message, but are added here for ease of reference):

1. INVITE sip: nwkngbe@nwkngbe.att.com SIP/2.0
2. Via: SIP/2.0/UDP fhas1.att.com:5060
3. Max-Forwards: 5
4. From: <sip:mtcce@mtcce.att.com>
5. To: <sip: nwkngbe@nwkngbe.att.com>
6. Call-ID: c394563-2010c 2e32238@fhas1.att.com
7. CSeq: 100 INVITE
8. Contact: sip: mtcce@mtcce.att.com:5060
9. Content-Length: 0

Line 1 identifies this message as an INVITE message and identifies the recipient of the message. In this case, the recipient is identified as nwkngbe@nwkngbe.att.com. Line 2 is the Via field which contains the transport protocol used to send the message, the sender's host name or network address, and the port number at which it wishes to receive responses. Line 3 contains the Max-Forwards field and indicates the number of times this message is allowed to be forwarded. Line 4 contains the From field and indicates the initiator of the request, in this case the network element in the overload condition. Line 5 contains the To field and indicates the recipient of the request, in this case a counterpart of the network element in the overload condition. Line 6 contains the Call-ID field which uniquely identifies the invitation. Line 7 contains the CSeq field and contains a single decimal sequence number and the request method. The CSeq header field serves to order transactions within a dialog, to provide a means to uniquely identify transactions, and to differentiate between new requests and request retransmissions. Line 8 is the Contact field and specifies the IP address and the port number combination of the originator of the INVITE. Line 9 is the Content-Length field and specifies the size of the message. In the present case, the Content-Length is 0 because there is no Content-Type (i.e., no payload) in the call request. Thus, in step 204, the overloaded network element sends an INVITE message to each of its counterpart network elements (or to each of its counterparts which are to be notified of the overload condition).

In step 206, the overloaded network element receives a TRYING message from the counterpart network elements to which an INVITE was sent in step 204. In accordance with the SIP protocol, a network element receiving an INVITE responds with a TRYING message. An exemplary TRYING message sent from a counterpart network element to the overloaded network element is as follows (the line numbers are not part of the SIP message, but are added here for ease of reference):

1. SIP/2.0 100 Trying
2. Via: SIP/2.0/UDP fhas1.att.com:5060; received=192.0.2.1
3. From: <sip:mtcee@mtcce.att.com>
4. To: <sip: nwkngbe@nwkngbe.att.com>
5. Call-ID: c394563-2010c 2e32238@fhas1.att.com
6. CSeq: 100 INVITE
7. Content-Length: 0

SIP TRYING messages are well known in the art and will not be described in further detail herein.

In step 208 the overloaded network element sends CANCEL messages to the same counterpart network elements to which it sent INVITE messages in step 204 and from which it received TRYING messages in step 206. An exemplary CANCEL message sent from an overloaded network element to a counterpart network element is as follows (the line numbers are not part of the SIP message, but are added here for ease of reference):

1. CANCEL sip: nwkngbe@nwkngbe.att.com SIP/2.0
2. Via: SIP/2.0/UDP fhas1.att.com:5060
3. From: <sip: mtcee@mtcee.att.com>
4. To: <sip: nwkngbe@mtcce.att.com>
5. Call-ID: c394563-2111c 2e32238@fhas1.att.com
6. CSeq: 101 CANCEL
7. Reason: sip: cause=503; text="Service Unavailable"

8. Retry-After: 5
9. Content-Length: 0

SIP CANCEL messages are well known in the art and will only be described further herein as necessary to describe the invention. Line 7 contains the Reason field, and in accordance with an embodiment of the invention, the cause is set to 503 and the text is set to "Service Unavailable". This indicates to the receiving counterpart network element that the reason for the CANCEL is that the sending network element is experiencing an overload condition. Line 8, in accordance with this embodiment of the invention, contains the Retry-After field and specifies the length of time that the counterpart network element is to wait prior to sending any additional requests to the sending network element. In this case, the Retry-After field contains a 5 as an exemplary threshold, which indicates that the counterpart network element receiving this CANCEL message is to wait 5 seconds prior to sending any additional requests to the sending network element.

In accordance with an advantageous aspect of the invention, the CANCEL message sent from the overloaded network element to the counterpart network elements may contain various instructed actions which will identify the action to be taken by the counterpart network elements in view of the overload condition. For example, as an alternate to the CANCEL message above, the CANCEL message may indicate that counterpart network elements should place a limit on the number of messages that may be sent to the overloaded network element. In one embodiment, this limit may be expressed as a number of messages that may be sent to the overloaded network element out of a total number of messages sent by the counterpart network element. For example, the CANCEL message may specify that the counterpart network element may only send 1 out of 5 of its sent request messages to the overloaded network element. The remaining requests must therefore be sent to other network elements (if available) which provide the same functionality as the overloaded network element. This process of limiting the number of messages sent to the overloaded network element is referred to herein as call gapping. In a CANCEL message instructing the counterpart network nodes to initiate call gapping, the above described exemplary CANCEL message would be modified by deleting line 8 and replacing line 7 with the following:

7. Reason: sip: cause=509; text="Service Request Gap— send 1 out of every 4".

It should be understood that in various embodiments the "509" could be replaced by other available (i.e., not otherwise reserved by the SIP protocol) numbers as well.

In step 210, the overloaded network element receives an OK message from the counterpart network elements to which a CANCEL message was sent in step 208. In accordance with the SIP protocol, a network element receiving a CANCEL message responds with an OK message which acknowledges receipt of the CANCEL message. An exemplary OK message sent from a counterpart network element to the overloaded network element is as follows (the line numbers are not part of the SIP message, but are added here for ease of reference):

1. SIP/2.0 200 OK
2. Via: SIP/2.0/UDP fhas1.att.com:5060; received=192.0.2.1
3. From: <sip:mtcee@mtcce.att.com>
4. To: <sip: nwkngbe@nwkngbe.att.com>
5. Call-ID: c394563-2010c 2e32238@fhas1.att.com
6. CSeq: 100 INVITE
7. Contact: sip: nwkngbe@mtcce.att.com:5060
8. Content-Length: 0

SIP OK messages are well known in the art and will not be described in further detail herein.

Upon receipt of OK messages from its counterpart network elements, the overloaded network element may confirm that its instructed actions, which were sent in response to the overload condition, will be followed by the counterpart network elements.

Figure 3:
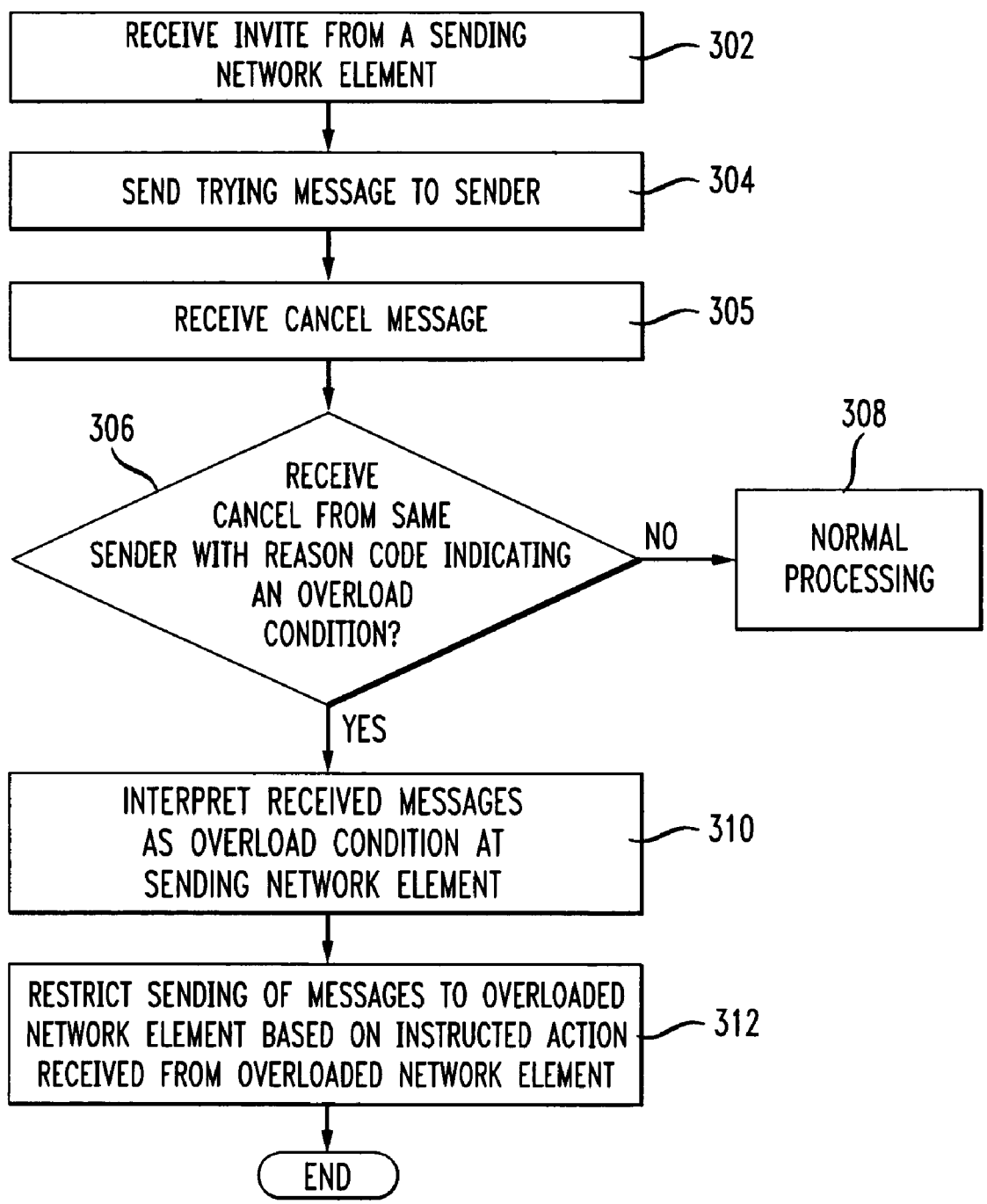
FIG. 3 shows a flowchart illustrating the steps performed by a network element in accordance with an embodiment of the invention.

FIG. 3 is a flowchart showing the processing steps of a network element (e.g., a counterpart network element) in accordance with the principles of the present invention. First, in step 302 a receiving network element receives an INVITE as sent by the overloaded network element in step 204. Next, in step 304, the receiving network element sends' a TRYING message as described above. In step 305 the receiving network element receives a CANCEL message, and in step 306 the receiving network element determines if the CANCEL message is from the same network element which sent the INVITE and if the CANCEL message indicates an overload condition. If the receiving network element does not receive an INVITE message followed by a CANCEL message indicating an overload condition, then the counterpart network element continues normal processing as represented by block 308.

If the receiving network element does receive an INVITE message followed by a CANCEL message indicating an overload condition, then as represented by block 310, the receiving network element interprets these messages as an indication that the sending network element (as identified in the From field of the messages) is in an overload condition. As represented by block 312, the receiving network element will restrict its sending of messages to the overloaded network element based on the instructed action received from the overloaded network element. As described above, in one embodiment the instructed action specifies a delay time period during which the counterpart network element will wait before sending any additional requests to the overloaded network element. In one embodiment, the amount of time that the receiving network element will wait is specified in the Retry-After field (line 8 in the example given above) of the CANCEL message. In the call gapping alternative embodiment as described above, the instructed action may indicate that counterpart network elements should place a limit on the number of messages that may be sent to the overloaded network element.

Thus, as described above, the receipt of both an INVITE message and a CANCEL message from the same sending network element containing specific data in the Reason field indicates to the receiving network element that the sending network element is in an overload condition, and the recipient network element will take appropriate action based upon an instructed action received from the overloaded network element. If the request messages sent from the counterpart network element to the overloaded network element are limited based on the instructed action, then the recipient network element may send requests to alternate network elements which provide the same services as the overloaded network element, if any such network elements are available. This prevents any delay in setting up a call due to sending a setup request to an overloaded network element.

If there is more than one network element executing on an overloaded network node, then each of these network elements may be considered to be overloaded and each such overloaded network element would perform as described above.

Figure 4:
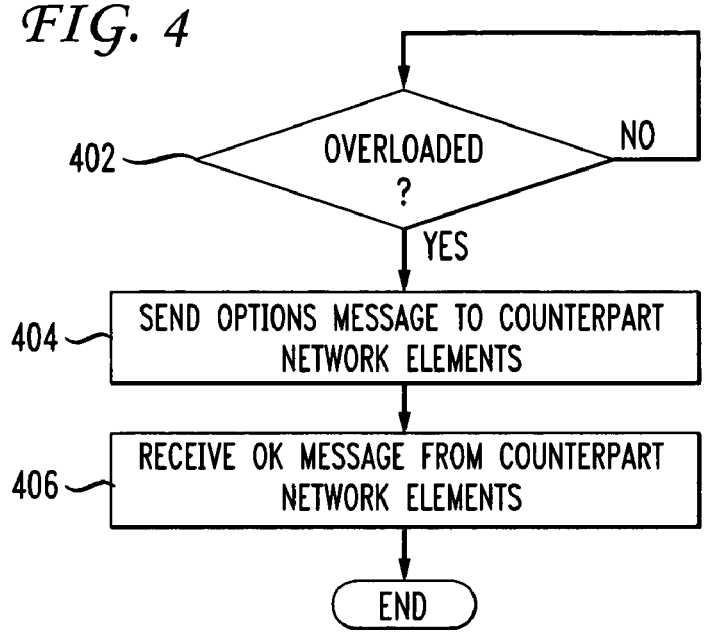
FIG. 4 shows a flowchart illustrating the steps performed by a network element in accordance with an embodiment of the present invention.
Figure 5:
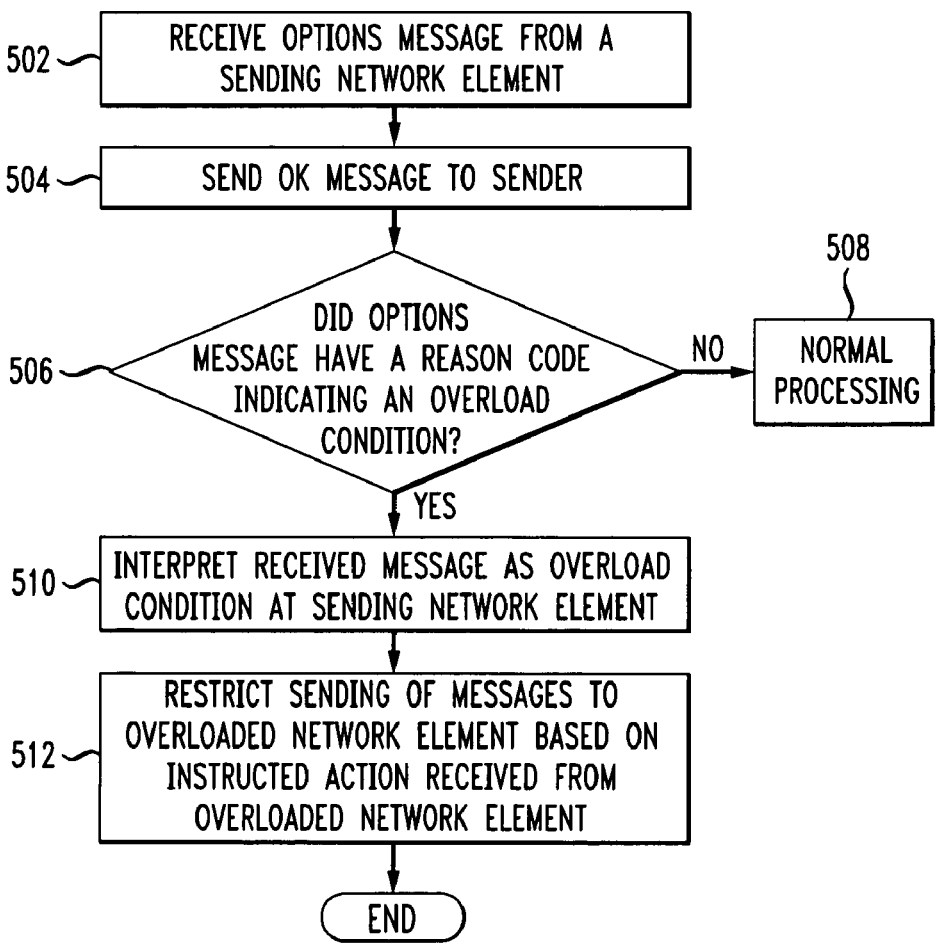
FIG. 5 shows a flowchart illustrating the steps performed by a network element in accordance with an embodiment of the invention.

FIGS. 4 and 5 show the steps performed by an overloaded network element, and counterpart network elements, respectively, in another embodiment of the invention which utilizes SIP OPTIONS messages in order to implement processing in accordance with the present invention. First, in step 402, the network element determines whether an overload condition exists on the network node implementing the network element. As described above in connection with step 202, there are various ways to accomplish this step and multiple configurable thresholds may be defined for a network element, such that if any one or more of the thresholds is exceeded, an overload condition is deemed to exist.

Upon detection of an overload condition, the network element executing on the overloaded network node sends an OPTIONS message to its counterpart network elements. Thus, in step 404, the network element executing on the overloaded network node sends an OPTIONS message to its counterpart network elements. An exemplary OPTIONS message sent from an overloaded network element to a counterpart network element is as follows (the line numbers are not part of the SIP message, but are added here for ease of reference):

1. OPTIONS sip:SB@SB_IP_Address.att.com:5060; user=phone SIP/2.0
2. Via: SIP/2.0/UDP AS_IP_Address.att.com:5060
3. From: "user"<sip:36602@AS_IP_Address.att.com>
4. To: <sip:SB@SB_IP_Address.att.com>
5. Call-ID: s911s488@AS_IP_Address.att.com
6. Reason: sip: cause=503; text="Service Unavailable"
7. Retry-After: 5
8. CSeq: 110 OPTIONS
9. Contact: <sip:AS@AS_IP_Address.att.com:5060>
10. Content-Length: 0

Line 6 contains the Reason header with the cause set to 503 and the text set to "Service Unavailable". This indicates to the receiving counterpart network element that the reason for this OPTIONS message with Reason header is that the sending network element is experiencing an overload condition. Line 7 contains the Retry-After field and specifies the length of time that the counterpart network element is to wait prior to sending any additional requests to the sending network element. In this case, the Retry-After field contains a 5 as an exemplary threshold, which indicates that the counterpart network element receiving this OPTIONS message is to wait 5 seconds prior to sending any additional requests to the sending network element.

In a manner similar to the CANCEL message described above, in accordance with an advantageous aspect of the invention, the OPTIONS message sent from the overloaded network element to the counterpart network elements may contain various instructed actions which will identify the action to be taken by the counterpart network elements in view of the overload condition. For example, as an alternate to the OPTIONS message above, the OPTIONS message may implement the call gapping aspect of the invention as described above. In an OPTIONS message instructing the counterpart network nodes to initiate call gapping, the above described exemplary OPTIONS message would be modified by deleting line 7 and replacing line 6 with the following:

6. Reason: sip: cause=509; text="Service Request Gap—send 1 out of every 4".

As described above, it should be understood that in various embodiments the "509" could be replaced by other available (i.e., not otherwise reserved by the SIP protocol) numbers as well.

In step 406, the overloaded network element receives an OK message from the counterpart network elements to which an OPTIONS was sent in step 404. An exemplary SIP OK message sent from the counterpart network elements back to the overloaded network element is as follows (the line numbers are not part of the SIP message, but are added here for ease of reference):

1. SIP/2.0 200 OK
2. Via: SIP/2.0/UDP AS_IP_Address.att.com:5060
3. From: "user"<sip:36602@AS_IP_Address.att.com>
4. To: <sip:SB@SB_IP_Address.att.com>
5. Call-ID: s911s488@AS_IP_Address.att.com
6. CSeq: 110 OPTIONS
7. Supported: 100rel
8. Content-Length: 0

SIP OK messages are well known in the art and will not be described in further detail herein.

FIG. 5 is a flowchart showing the processing steps of a network element (e.g., a counterpart network element) in accordance with this embodiment of the invention. First, in step 502 a receiving network element receives an OPTIONS as sent by the overloaded network element in step 404. Next, in step 504, the receiving network element sends an OK message as described above. In step 506 the receiving network element determines if the received OPTIONS message with Reason header indicates an overload condition. If the OPTIONS message does not indicate an overload condition, then the counterpart network element continues normal processing as represented by block 508.

If the OPTIONS message does indicate an overload condition, then as represented by block 510, the receiving network element interprets the messages as an indication that the sending network element (as identified in the From field of the OPTIONS message) is in an overload condition. As represented by block 512, and as described above in connection with step 312 of FIG. 3, the receiving network element will restrict its sending of messages to the overloaded network element based on the instructed action received from the overloaded network element.

It is noted that the use of the call gapping technique as described above requires that the overloaded network element notify its counterpart network elements when it is no longer in an overload condition. This may be accomplished by the use of another OPTIONS message as described above, except that the OPTIONS message may contain a Reason field as follows:

6. Reason: sip: cause=509; text="Service Request Gap—send 4 out of every 4".

The processing is similar to the processing described above in connection with FIGS. 4 and 5, except that upon receipt of an OPTIONS message containing this Reason field, the counterpart network elements will remove the call gapping restrictions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for congestion control in an IP network comprising the steps of:

determining an overload condition at a first network element;

sending a first message, in response to the determination of the overload condition, from the first network element to at least one other network element;

receiving, at the first network element, a second message from the at least one other network element sent in response to receiving the first message;

sending a third message, in response to receiving the second message, from the first network element to the at least one other network element, the third message comprising an indication that the first network element is overloaded; and receiving, at the first network element, a fourth message from the at least one other network element, the fourth message comprising an acknowledgement of the third message, wherein:

the first message is a SIP INVITE message;
the second message is a SIP TRYING message;
the third message is a SIP CANCEL message; and
the fourth message is a SIP OK message.

2. The method of claim 1 wherein the SIP INVITE message does not have a session description protocol.

3. The method of claim 1 wherein the step of determining an overload condition at a first network element further comprises the step of:

determining that the first network element has exceeded one of a plurality of processing thresholds.

4. The method of claim 3 wherein the plurality of processing thresholds are configurable.

5. The method of claim 1 wherein the third message further comprises one of a plurality of instructed actions for the at least one other network element.

6. The method of claim 5 wherein the instructed action is chosen based upon the exceeded processing threshold.

7. The method of claim 5 wherein the instructed action specifies a delay time period during which request messages are not to be sent to the first network element.

8. The method of claim 1 wherein the at least one other network element comprises a plurality of network elements which potentially send request messages to the first network element.

9. A method for congestion control in an IF network comprising the steps of:

determining an overload condition at a first network element;

sending a first message, in response to the determination of the overload condition, from the first network element to at least one other network element;

receiving, at the first network element, a second message from the at least one other network element sent in response to receiving the first message;

sending a third message, in response to receiving the second message, from the first network element to the at least one other network element, the third message comprising an indication that the first network element is overloaded; and receiving, at the first network element, a fourth message from the at least one other network element, the fourth message comprising an acknowledgement of the third message, wherein the third message further comprises one of a plurality of instructed actions for the at least one other network element and the instructed action specifies a limit on a number of requests that the at least one other network element may send to the first network element.

10. A method for congestion control in an IP network comprising the steps of:

receiving at a first network element a first message sent from a second network element, the first message sent in response to a determination of an overload condition at the second network element;

sending a second message from the first network element to the second network element, in response to receiving the first message;

receiving at the first network element a third message sent from the second network element in response to receiving the second message;

if the third message comprises an indication that the second network element is overloaded then restricting request messages from the first network element to the second network element; and sending a fourth message from the first network element to the second network element, the fourth message comprising an acknowledgement of the third message, wherein:

the first message is a SIP INVITE message;
the second message is a SIP TRYING message;
the third message is a SIP CANCEL message; and
the fourth message is a SIP OK message.

11. The method of claim 10 further comprising the step of:
the first network element sending request messages to alternate network elements which provide the same service as the second network element.

12. The method of claim 10 wherein the restricting is based on an instructed action received in the third message.

13. The method of claim 12 wherein the instructed action specifies a delay time period during which request messages are not to be sent to the second network element.

14. A method for congestion control in an IP network comprising the steps of:

receiving at a first network element a first message sent from a second network element, the first message sent in response to a determination of an overload condition at the second network element;

sending a second message from the first network element to the second network element, in response to receiving the first message;

receiving at the first network element a third message sent from the second network element in response to receiving the second message;

if the third message comprises an indication that the second network element is overloaded then restricting request messages from the first network element to the second network element; and sending a fourth message from the first network element to the second network element, the fourth message comprising an acknowledgement of the third message, wherein the restricting is based on an instructed action received in the third message and the instructed action specifies a limit on a number of requests that the first network element may send to the second network element.

15. A method for congestion control in an IP network comprising the steps of:

determining an overload condition at a first network element;

sending a first message from the first network element, in response to the determination of the overload condition, to at least one counterpart network element;

sending a second message from the at least one counterpart network element to the first network element in response to the first message;

sending a third message, in response to receiving the second message, from the first network element to the at least one counterpart network element, the third message comprising an indication that the first network element is overloaded; and in response to receipt of the third message at the at least one counterpart network element, determining that the first network element is in an overload condition and restricting request messages from the at least one counterpart network element to the first network element; and sending a fourth message from the at least one counterpart network element to the first network element, the fourth message comprising an acknowledgement of the third message, wherein:

the first message is a SIP INVITE message;
the second message is a SIP TRYING message;
the third message is a SIP CANCEL message; and
the fourth message is a SIP OK message.

16. The method of claim 15 wherein the restricting is based on an instructed action in the third message.

17. The method of claim 16 wherein the instructed action specifies a delay time period during which request messages are not to be sent to the first network element.

18. The method of claim 15 further comprising the step of:
the at least one counterpart network element sending request messages to alternate network elements which provide the same service as the first network element.

19. A method for congestion control in an IP network comprising the steps of:

determining an overload condition at a first network element;

sending a first message from the first network element, in response to the determination of the overload condition, to at least one counterpart network element;

sending a second message from the at least one counterpart network element to the first network element in response to the first message;

sending a third message, in response to receiving the second message, from the first network element to the at least one counterpart network element, the third message comprising an indication that the first network element is overloaded; and in response to receipt of the third message at the at least one counterpart network element, determining that the first network element is in an overload condition and restricting request messages from the at least one counterpart network element to the first network element; and sending a fourth message from the at least one counterpart network element to the first network element, the fourth message comprising an acknowledgement of the third message, wherein the restricting is based on an instructed action in the third message and the instructed action specifies a limit on a number of requests that the at least one counterpart network element may send to the first network element.

20. A method for congestion control in an IP network comprising the steps of:

determining that a first network element has exceeded one of a plurality of processing thresholds;

sending a SIP OPTIONS message from the first network element to at least one other network element, the SIP OPTIONS message indicating that the first network element is overloaded and comprising one of a plurality of instructed actions for the at least one other network element; and receiving a SIP OK message from the at least one other network element, wherein the instruction action specifies a limit on a number of requests that the at least one other network element may send to the first network element.

21. The method of claim 20 wherein the instructed action is chosen based upon the exceeded processing threshold.

22. The method of claim 20 wherein the instructed action specifies a delay time period during which request messages are not to be sent to the first network element.

23. The method of claim 20 further comprising the step of:
sending another SIP OPTIONS message from the first network element to the at least one other network element, the another SIP OPTIONS message comprising an instructed action removing the limit.

24. The method of claim 20 wherein the at least one other network element comprises a plurality of network elements which potentially send request messages to the first network element.

25. A method for congestion control in an IP network comprising the steps of:

receiving at a first network element a SIP OPTIONS message sent from a second network element, the SIP OPTIONS message indicating that the second network element is overloaded and comprising an instructed action;

sending a SIP OK message from the first network element to the second network element; and restricting request messages from the first network element to the second network element in accordance with the instructed action, wherein the instructed action specifies a limit on a number of requests that the first network element may send to the second network element.

26. The method of claim 25 further comprising the step of:
the first network element sending request messages to alternate network elements which provide the same service as the second network element.

27. The method of claim 25 wherein the instructed action specifies a delay time period during which request messages are not to be sent to the second network element.

28. The method of claim 25 further comprising the step of:
receiving at the first network element another SIP OPTIONS message sent from the second network element, the another SIP OPTIONS message comprising an instructed action removing the limit.

* * * * *